US010079565B2

(12) United States Patent
Ota

(10) Patent No.: US 10,079,565 B2
(45) Date of Patent: Sep. 18, 2018

(54) ELECTRICALLY-DRIVEN VEHICLE

(71) Applicant: TOYOTA JIDOSHA KABUSHIKI KAISHA, Toyota-shi, Aichi-ken (JP)

(72) Inventor: Takashi Ota, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 295 days.

(21) Appl. No.: 14/696,767

(22) Filed: Apr. 27, 2015

(65) Prior Publication Data

US 2015/0318811 A1    Nov. 5, 2015

(30) Foreign Application Priority Data

May 1, 2014    (JP) ................................ 2014-094747

(51) Int. Cl.
*H02P 23/08*    (2006.01)
*H02P 29/68*    (2016.01)
(Continued)

(52) U.S. Cl.
CPC .............. *H02P 23/08* (2013.01); *B60L 1/02* (2013.01); *B60L 3/0046* (2013.01); *B60L 7/14* (2013.01); *B60L 11/14* (2013.01); *B60L 11/1803* (2013.01); *B60L 11/1872* (2013.01); *B60L 11/1875* (2013.01); *B60L 15/20* (2013.01); *H02P 5/74* (2013.01); *H02P 29/68* (2016.02); *B60L 2210/14* (2013.01);
(Continued)

(58) Field of Classification Search
CPC .................... H02P 23/08; B60L 1/02

USPC ........................................................ 318/139
See application file for complete search history.

(56) References Cited

U.S. PATENT DOCUMENTS 2,403,557 A * 7/1946 Sanders, Jr. ........... G01R 23/09
324/76.67
3,439,245 A * 4/1969 Perdue .................... G01P 1/103
318/459
(Continued)

FOREIGN PATENT DOCUMENTS

JP          7-15804         1/1995
JP       2010-093969 A      4/2010
(Continued)

OTHER PUBLICATIONS

U.S. Appl. No. 14/520,460 (inventor: T. Ota), filed Oct. 22, 2014.
(Continued)

*Primary Examiner* — Eduardo Colon Santana
*Assistant Examiner* — Devon Joseph
(74) *Attorney, Agent, or Firm* — Finnegan, Henderson, Farabow, Garrett & Dunner, LLP

(57) ABSTRACT

An electrically-driven vehicle includes: a battery; an induction motor connected to the battery; a synchronous motor connected to the battery that is connected to the induction motor; and at least one electronic control unit configured to change a slip frequency command of the induction motor based on a predetermined frequency of current fluctuation when a temperature of the battery is low such that an amplitude of the current fluctuation increases, the current fluctuation being any one of current fluctuation of a battery current or current fluctuation of a battery-related current that relates to the battery current.

6 Claims, 9 Drawing Sheets

(51) Int. Cl.
  *B60L 1/02* (2006.01)
  *B60L 3/00* (2006.01)
  *B60L 7/14* (2006.01)
  *B60L 11/14* (2006.01)
  *B60L 11/18* (2006.01)
  *B60L 15/20* (2006.01)
  *H02P 5/74* (2006.01)

(52) U.S. Cl.
  CPC ....... *B60L 2210/40* (2013.01); *B60L 2220/12* (2013.01); *B60L 2220/14* (2013.01); *B60L 2220/46* (2013.01); *B60L 2240/12* (2013.01); *B60L 2240/421* (2013.01); *B60L 2240/423* (2013.01); *B60L 2240/429* (2013.01); *B60L 2240/527* (2013.01); *B60L 2240/529* (2013.01); *B60L 2240/545* (2013.01); *B60L 2240/547* (2013.01); *B60L 2240/549* (2013.01); *B60L 2250/26* (2013.01); *B60L 2260/28* (2013.01); *Y02T 10/644* (2013.01); *Y02T 10/645* (2013.01); *Y02T 10/70* (2013.01); *Y02T 10/705* (2013.01); *Y02T 10/7005* (2013.01); *Y02T 10/7077* (2013.01); *Y02T 10/7225* (2013.01); *Y02T 10/7241* (2013.01); *Y02T 10/7275* (2013.01)

(56) References Cited

U.S. PATENT DOCUMENTS

| | | | | |
|---|---|---|---|---|
| 3,568,022 A | * | 3/1971 | Domann | B60T 8/172 318/800 |
| 3,800,199 A | * | 3/1974 | Weigand | H02P 27/06 318/701 |
| 3,896,356 A | * | 7/1975 | Hoffman | H02P 27/045 318/661 |
| 4,757,240 A | * | 7/1988 | Mizobuchi | B60L 9/22 318/52 |
| 4,926,105 A | * | 5/1990 | Mischenko | H02P 21/06 318/800 |
| 5,086,264 A | * | 2/1992 | Kelledes | B60L 11/1803 318/798 |
| 5,365,153 A | * | 11/1994 | Fujita | B06B 1/0261 318/34 |
| 5,583,406 A | * | 12/1996 | Mutoh | B60L 7/12 318/139 |
| 5,629,592 A | * | 5/1997 | Henmi | B60L 9/30 303/41 |
| 5,941,328 A | * | 8/1999 | Lyons | B60L 11/123 180/65.1 |
| 2001/0012211 A1 | * | 8/2001 | Hasegawa | H02J 3/16 363/131 |
| 2001/0034571 A1 | * | 10/2001 | Yoshino | B60K 6/46 701/22 |
| 2004/0070363 A1 | * | 4/2004 | Bardsley | H02P 23/08 318/727 |
| 2006/0076914 A1 | * | 4/2006 | Yaguchi | H02P 25/098 318/432 |
| 2006/0138992 A1 | * | 6/2006 | Yamamoto | H02P 21/08 318/727 |
| 2009/0021198 A1 | * | 1/2009 | Okamura | B60K 6/365 318/400.3 |
| 2012/0123626 A1 | * | 5/2012 | Takahashil | B60L 11/1872 701/22 |
| 2012/0239237 A1 | * | 9/2012 | Hashimoto | B60K 6/365 701/22 |
| 2012/0249024 A1 | * | 10/2012 | Saha | H02P 21/06 318/400.02 |
| 2013/0207590 A1 | * | 8/2013 | Yanagihara | H02P 23/00 318/807 |
| 2015/0171776 A1 | * | 6/2015 | Ota | B60L 9/22 318/8 |

FOREIGN PATENT DOCUMENTS

| | | |
|---|---|---|
| KR | 10-2004-0005123 A | 1/2004 |
| KR | 10-2011-0112132 A | 10/2011 |
| KR | 10-2012-0015461 | 2/2012 |

OTHER PUBLICATIONS

U.S. Appl. No. 14/565,765 (inventor: T. Ota), filed Dec. 10, 2014.

* cited by examiner

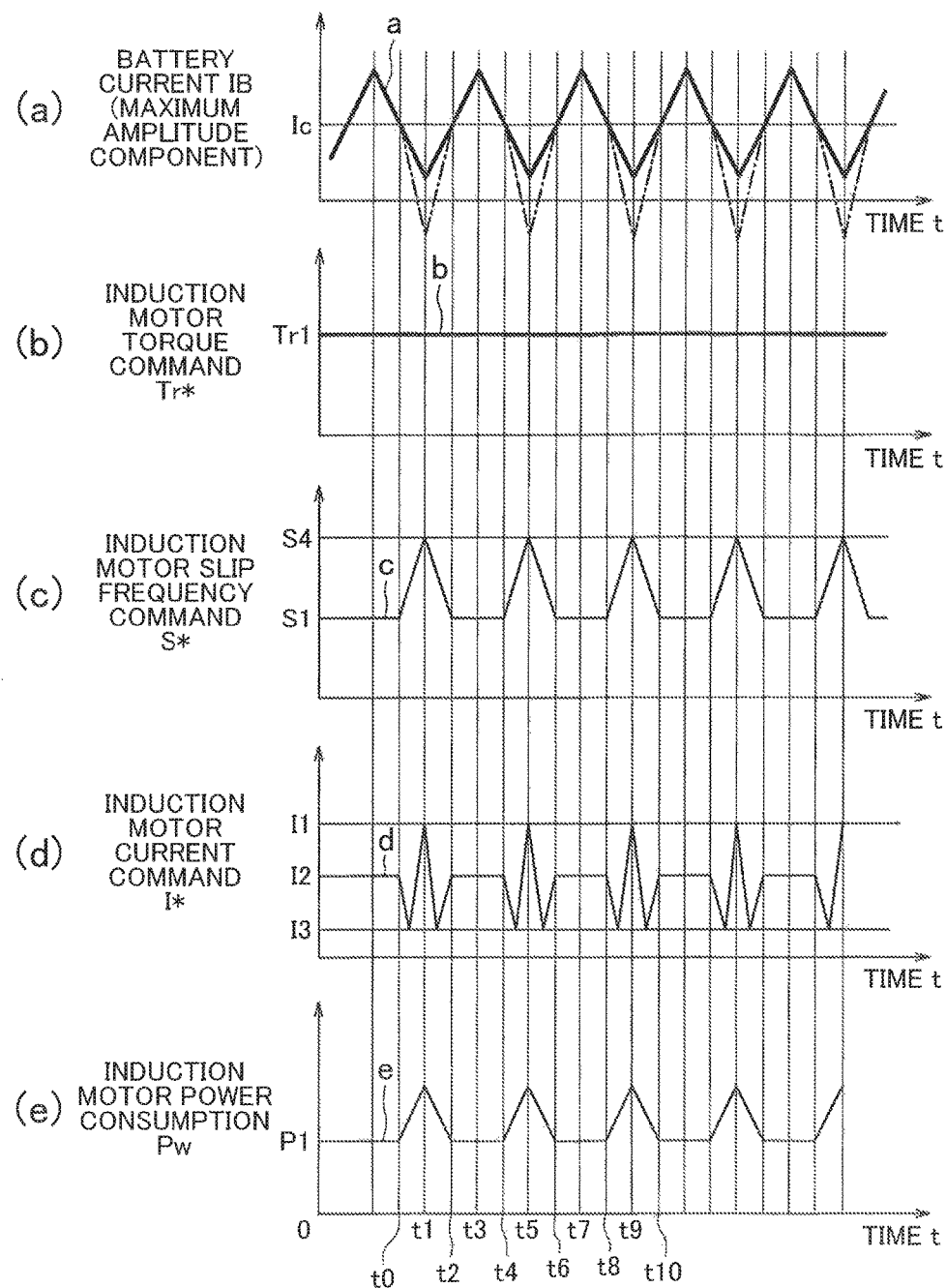

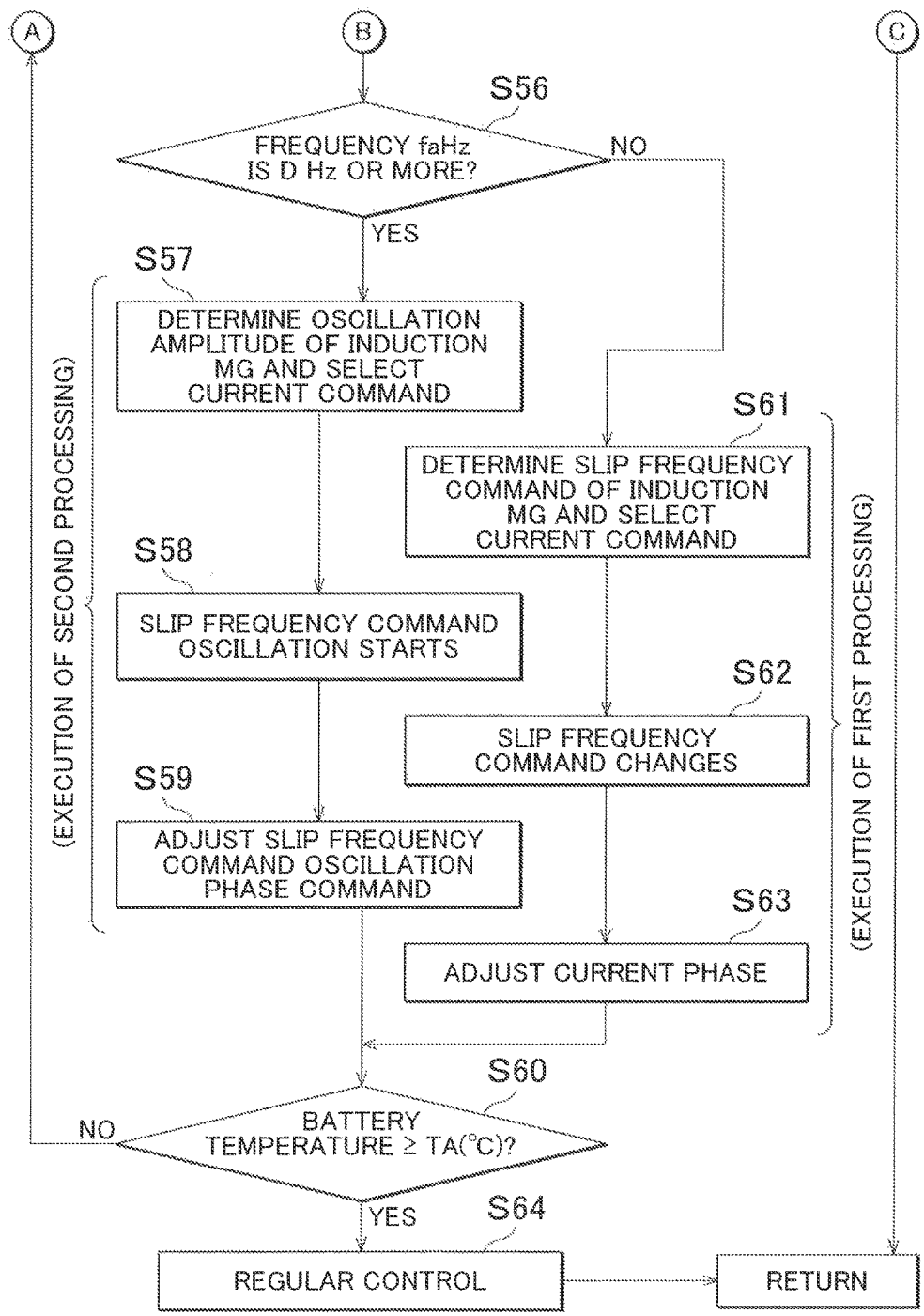

US 10,079,565 B2

ELECTRICALLY-DRIVEN VEHICLE

INCORPORATION BY REFERENCE

The disclosure of Japanese Patent Application No. 2014-094747 filed on May 1, 2014 including the specification, drawings and abstract is incorporated herein by reference in its entirety.

BACKGROUND OF THE INVENTION

1. Field of the Invention

The present invention relates to an electrically-driven vehicle and more particularly to a control for raising a temperature of a battery.

2. Description of Related Art

In an electrically-driven vehicle, for example, an electric vehicle which is driven by a motor, or a hybrid vehicle which is driven with outputs of a motor and an engine, in some cases, a DC voltage from a battery which is a power source is supplied to an inverter via a boosting device or without the boosting device and converted to an AC power by the inverter, and then the converted power is supplied to the motor for driving the vehicle.

Japanese Patent Application Publication No. 07-15804 (JP No. 07-15804 A) describes an electrically-driven vehicle with a synchronous motor and an induction motor which are commonly connected to a battery as a motor for driving the vehicle. In this electrically-driven vehicle, its front wheels are driven by a plurality of the synchronous motors and its rear wheels are driven by the induction motor.

SUMMARY OF THE INVENTION

When the temperature of the battery of the electrically-driven vehicle is low, the battery is protected by limiting charge and discharge electric power. Limiting of the charge electric power may cause a change in operability due to a reduction in regenerative torque of the motor or deterioration of fuel efficiency due to a reduction in the regenerative power. On the other hand, limiting of the discharge electric power may lead to a reduction in acceleration performance of the vehicle due to a reduction in the output of the motor or deterioration of fuel efficiency due to enlargement of an engine drive zone in case of a hybrid vehicle. In such circumstances, acceleration of the temperature rise of the battery is required when the temperature of the battery is low.

The present invention accelerates the temperature rise of the battery of the electrically-driven vehicle when the temperature of the battery is low.

The electrically-driven vehicle of the present invention includes: a battery, an induction motor and a synchronous motor which are commonly connected to the battery; and an electronic control unit which, based on a predetermined frequency of a current fluctuation of a battery current, changes a slip frequency command for the induction motor so as to increase the amplitude of the current fluctuation.

The electrically-driven vehicle of the present invention is capable of increasing the amplitude of the fluctuation of a battery current and thus can accelerate the temperature rise of the battery.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 7 is a diagram showing changes with time lapse of a battery temperature TB, a battery current IB, an induction motor torque command Tr*, a slip frequency command S*, an induction motor current command I* and an induction motor power consumption Pw in the electrically-driven vehicle according to the embodiment of the present invention when the battery temperature rise control shown in FIG. 6 is executed; and FIG. 8A

DETAILED DESCRIPTION OF EMBODIMENTS

Figure 1:
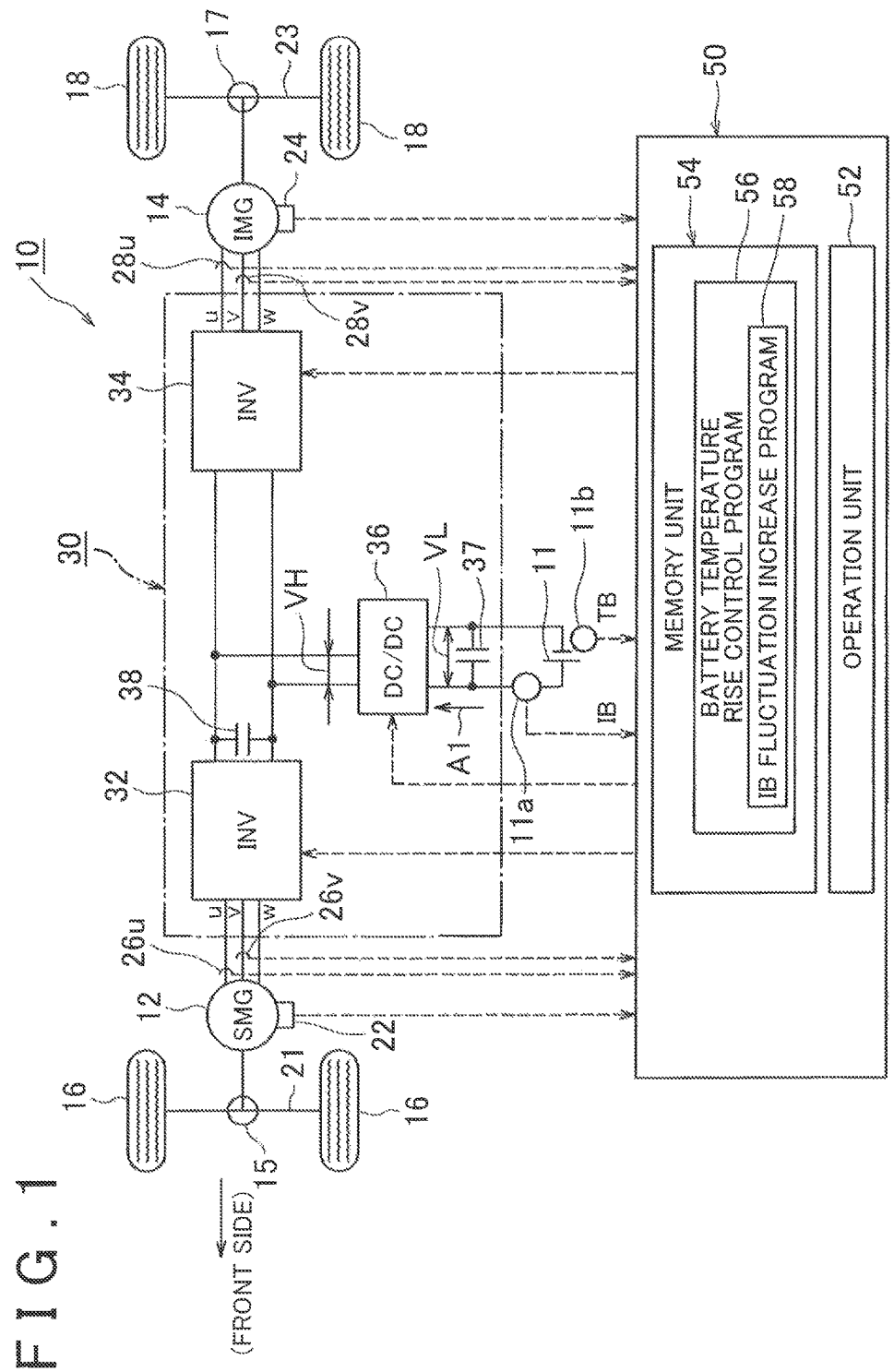
FIG. 1 is a configuration diagram of an electrically-driven vehicle according to an embodiment of the present invention.

Hereinafter, embodiments of the present invention will be described with reference to the drawings. In the following description, plural embodiments or modifications may be carried out appropriately in any combinations. In the following description, all drawings will be described with the same reference numerals given to the same components. Further, a synchronous motor generator and an induction motor generator which have additional function as a power generator will be described below as the synchronous motor and induction motor for driving a vehicle. However, the motors may have a function of an electric motor only. Moreover, a vehicle in which its front wheels and rear wheels are driven with two motor generators will be described as the electrically-driven vehicle in the following description. However, the electrically-driven vehicle may be a hybrid vehicle having an engine and a motor generator as a driving source for traveling. The electrically-driven vehicle may also be an electric vehicle or a fuel-cell vehicle.

As shown in FIG. 1, an electrically-driven vehicle 10 of the present embodiment includes a battery 11, a synchronous motor generator 12 and an induction motor generator 14 which are commonly connected to the battery 11, a front drive mechanism 15 and front wheels 16, a rear drive mechanism 17 and rear wheels 18, a PCU 30, and an electronic control unit 50.

The synchronous motor generator 12 is connected to the battery 11 and driven with an electric power supplied from the battery 11 via the PCU 30 which will be described later. The synchronous motor generator 12 may be a three-phase synchronous motor generator which includes a rotor in which a permanent magnet is incorporated and as well as a stator. In the following description, the "synchronous motor generator" is described as "synchronous MG" and the "induction motor generator" is described as "induction MG".

A drive power of the synchronous MG 12 is transmitted to a front axle 21 via a front drive mechanism 15 so that the front wheels 16 connected to the axle 21 are driven. The synchronous MG 12 has a function as a generator for electric power regeneration when regenerative braking is performed during deceleration of a vehicle. Electric power generated in the synchronous MG12 is supplied to the battery 11 via the PCU 30 so that the battery 11 is charged. The synchronous MG 12 is provided with a first rotation sensor 22 which detects a rotation angle of a rotation axis of the synchronous MG 12.

The induction MG 14 is a three-phase induction motor generator which is connected to the battery 11 similar to the synchronous MG 12 and driven by an electric power supplied from the battery 11 via the PCU 30. The induction MG 14 may be a cage rotor configured to include a rotor and a stator, the rotor including a laminate of electrical steel sheets, a plurality of conductor bars penetrating the laminate, and conductor rings which are provided on both sides of the laminate in the axial direction and connected to end portions of the plurality of the conductor bars. The rotor of the induction MG 14 may be a rotor with coil which is provided with a plurality of induction coils.

A drive force of the induction MG 14 is transmitted to a rear axle 23 via the rear drive mechanism 17 so that the rear wheels 18 connected to the axle 23 are driven. The induction MG 14 too has a function as the generator for electric power regeneration when a regenerative braking is performed during deceleration of the vehicle and a power generated in the induction MG 14 is supplied to the battery 11 via the PCU 30 so that the battery 11 is charged. The induction MG 14 is provided with a second rotation sensor 24 which detects a rotation angle of the rotation axis of the induction MG 14. Signals indicating detection values of the first rotation sensor 22 and the second rotation sensor 24 are transmitted to the electronic control unit 50.

The front drive mechanism 15 or the rear drive mechanism 17 may be a drive power dividing mechanism configured to output at least part of drive powers from the engine and the motor generator to the axle 21 or the axle 23 in the case where the electrically-driven vehicle 10 is a hybrid vehicle. The drive power dividing mechanism is formed of a planetary gear mechanism.

The PCU 30 is connected among the synchronous MG 12, the induction MG 14, and the battery 11. The PCU 30 includes a first inverter 32, a second inverter 34 and a boost converter 36. The boost converter 36 is controlled by a control signal from the electronic control unit 50, and the first inverter 32 and the second inverter 34 are controlled by control signals from the electronic control unit 50. The boost converter 36 includes two switching elements connected to each other in series, two diodes connected in parallel so as to feed a reverse current to each of switching elements, and a reactor of which one end is connected between the respective switching elements. As the switching element, a transistor such as an IGBT is used. The boost converter 36 is connected between the battery 11 and the first inverter 32 and between the battery 11 and the second inverter 34. When the boost converter 36 is controlled by the electronic control unit 50 according to a boost command, the boost converter 36 boosts a DC voltage on the voltage VL side input from the battery 11 and outputs the boosted voltage to the first inverter 32 and the second inverter 34.

The boost converter 36 has another function of reducing a DC voltage on the output side (voltage VH side) and outputting the DC voltage to the battery 11 when controlled according to a voltage reduction command from the electronic control unit 50. As a result, the battery 11 is charged. To detect a DC voltage VL on the input side of the boost converter 36 and a DC voltage VH on the output side thereof, voltage sensors (not shown) are provided respectively and a detected value of each voltage sensor is transmitted to the electronic control unit 50.

The first inverter 32 converts a DC voltage input from the boost converter 36 to an AC voltage and outputs the AC voltage to the synchronous MG 12 to drive the synchronous MG 12. The first inverter 32 has another function of converting the AC voltage obtained by the regeneration to a DC voltage and outputting the DC voltage to the boost converter 36 when the synchronous MG 12 regenerates electric power.

The second inverter 34 converts a DC voltage input from the boost converter 36 to an AC voltage and supplies the AC voltage to the induction MG 14 to drive the induction MG 14. The second inverter 34 has another function of converting the AC voltage obtained by the regeneration to a DC voltage and outputting the DC voltage to the boost converter 36 when the induction MG 14 regenerates electric power.

Each of the first inverter 32 and the second inverter 34 includes a switching elements provided on each of an upper arm and a lower arm of three phases U, V, W, and switching of each switching element is controlled according to a control signal from the electronic control unit 50. The upper arm and the lower arm of each of the phase U, V, W of the first inverter 32 and an input terminal of each phase of the synchronous MG 12 are connected by power lines. Among the power lines of the respective phases, current sensors $26u$, $26v$ for detecting a motor current are mounted on power lines of the U phase and V phase. Although no current sensor is mounted on the power line of the W phase, a current value of the W phase can be calculated from the current values of the U phase and the V phase because the total current of the respective phases is zero in the case of three-phase AC. Similarly, current sensors $28u$, $28v$ are mounted on the power lines of the U phase and V phase which connect the second inverter 34 to the induction MG 14. Signals indicating detection values of the respective current sensors $26u$, $26v$, $28u$, $28v$ are transmitted to the electronic control unit 50.

The battery 11 is a nickel metal hydride battery, a lithium ion battery, or the other type of secondary battery. A system relay (not shown) is provided between the battery 11 and the boost converter 36, and ON/OFF operation of the system relay is controlled by the electronic control unit 50. Smoothing capacitors 37, 38 are connected between the boost converter 36 and the battery 11, and between the boost converter 36 and each of the first inverter 32 and the second inverter 34.

A battery current sensor 11a which detects a battery current IB where a current in the direction of an arrow A1 in FIG. 1 is positive, is connected to the battery 11, and a signal indicating a detection value IB of the battery current sensor 11a is transmitted to the electronic control unit 50. The battery 11 is also provided with a battery temperature sensor 11b for detecting a temperature TB of the battery 11 and a signal indicating a detection value TB of the battery temperature sensor 11b is transmitted to the electronic control unit 50. Instead of the battery current sensor 11a or with the battery current sensor 11a, the battery 11 may be also provided with a reactor current sensor for detecting a reactor current IL which is a current flowing through the reactor composed of the boost converter 36 and is a battery-related current, and transmitting a signal indicating the detection value IL to the electronic control unit 50.

An accelerator position sensor (not shown) detects an accelerator position AP of an accelerator pedal and a signal indicating the accelerator position AP is transmitted to the electronic control unit 50. The front and rear axles 21, 23 are provided with a front vehicle velocity sensor and a rear vehicle velocity sensor (not shown) for detecting a vehicle velocity from a rotation speed of the axles 21, 23, and signals indicating detection values of each of the front and rear vehicle velocity sensors are transmitted to the electronic control unit 50. An average value based on the detection values of both of the front and rear vehicle velocity sensors is used as a vehicle velocity detection value. The detection value of only one of the front and rear vehicle velocity sensors may be used, and the other vehicle velocity sensor may be omitted in this case.

The electronic control unit 50 includes a microcomputer containing a CPU and a memory. Although only one electronic control unit 50 is shown as the electronic control unit 50 in the illustrated example, the electronic control unit 50 may be appropriately divided into a plurality of components so that those components are connected with each other by a signal cable. The electronic control unit 50 includes an operation unit 52 containing a CPU, a memory unit 54 having a memory, and a machine/sensor interface (not shown). The internal memory unit 54 includes control data and a control program for an electrically-driven vehicle, and a battery temperature rise control program 56 which will be described later. The battery temperature rise control program 56 has an IB fluctuation increase program 58. The control data contains an optimum efficiency line E and characteristic curves "a" to "e" of the induction MG 14 shown in FIG. 2. The respective switching elements of the boost converter 36, the first inverter 32 and the second inverter 34 are connected to the electronic control unit 50 via the machine/sensor interface and actuated according to a command from the control unit 50. Outputs of the current sensors 26u, 26v, 28u, 28v, the voltage sensor, the rotation sensors 22, 24 and the vehicle velocity sensors are input to the electronic control unit 50 via the machine/sensor interface.

Prior to explaining an operation of the electrically-driven vehicle 10, the output torque characteristic and control for a slip frequency S of the induction MG 14 will be described with reference to FIG. 2.

Figure 2:
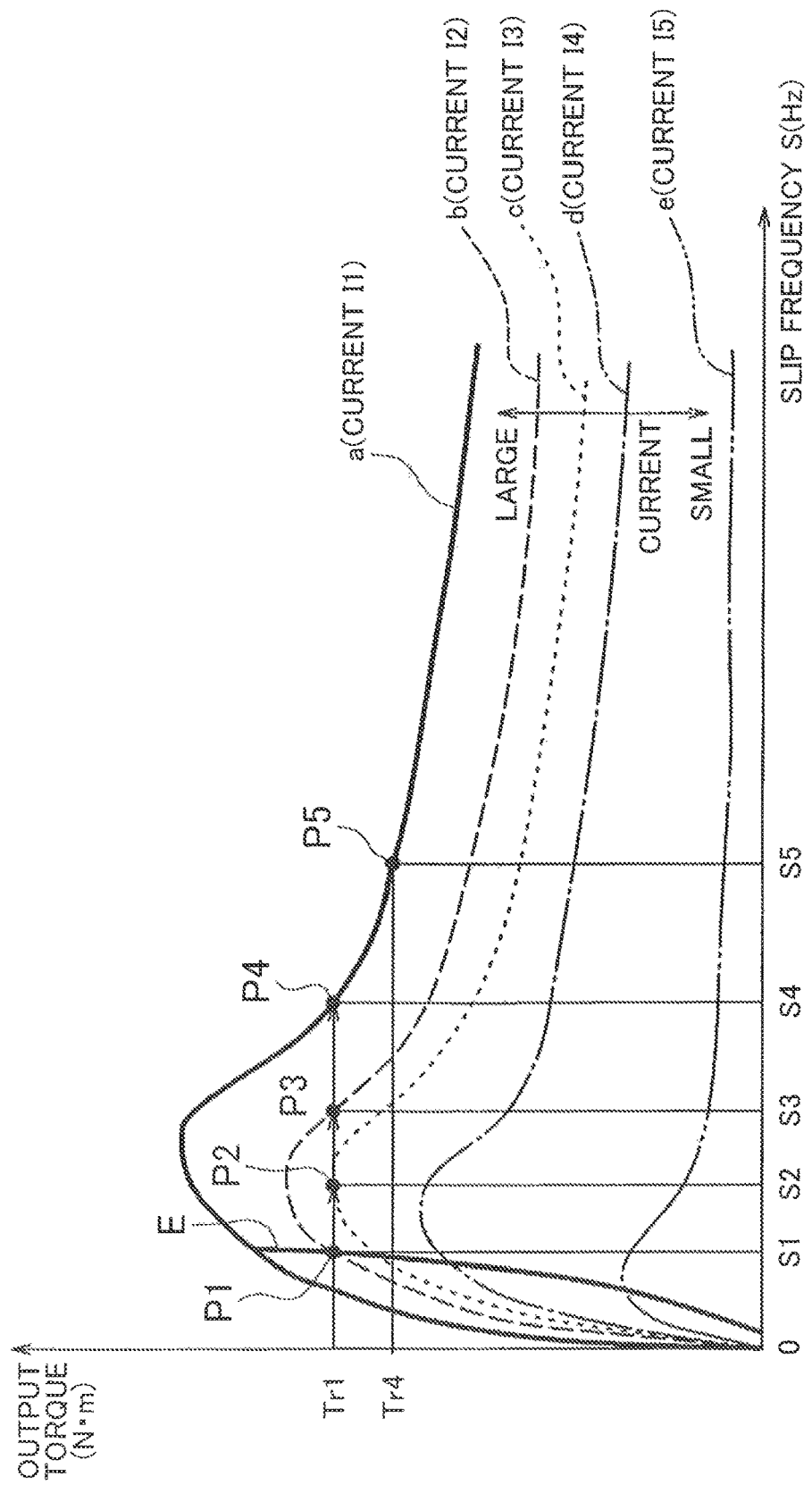
FIG. 2 is a diagram showing characteristic curves which shows a relationship among a torque, a slip frequency, and a current of an induction motor generator used in the electrically-driven vehicle according to the embodiment of the present invention.

Each of a solid line "a", a broken line "b", a dotted line "c", a dashed line "d", and a two-dot chain line "e" in FIG. 2 is a characteristic curve which indicates a relationship between the output torque and the slip frequency S under currents I1, I2, I3, I4, I5 (I1>I2>I3>I4>I5) supplied to the induction MG 14. The solid line "a" in FIG. 2 is a characteristic curve when the current I1 flowing through the stator coil reaches its maximum. In the induction MG 14, as shown by the curves "a" to "e" in FIG. 2, when the slip frequency S is zero, that is, a difference between the electric frequency of the rotor resulting from a rotation of the rotor and the electric frequency of a current flowing through the stator coil is zero, its output torque is zero. As the slip frequency S increases, that is, the difference between the electric frequency of the rotor by the rotation of the rotor and the electric frequency of the current flowing through the stator coil increases, the output torque increases. If the slip frequency S is increased, the output torque reaches its maximum at a certain slip frequency S and if the slip frequency S is increased further, the output torque decreases as the slip frequency S increases. The larger the current I flowing through the stator coil is, the larger the output torque becomes, and the smaller the current I is, the smaller the output torque becomes.

The bold solid line E in FIG. 2 is an optimum efficiency line E which connects a point of a current I which allows to obtain a certain output torque most efficiently, with a point of the slip frequency S when driving the induction MG 14 having the above-described characteristic. Thus, when an operating point of the induction MG 14 deviates from the optimum efficiency line E, the efficiency of the induction MG 14 drops so that an amount of power consumption for the same output increases. Under a regular control, the electronic control unit 50 determines a current value I (A) to be supplied to the stator coil and a slip frequency S (Hz) thereof along the optimum efficiency line E for a requested torque. Then, the electronic control unit 50 calculates an electric frequency fr (Hz) of the rotor from a rotational speed of the rotor of the induction MG 14 detected by the second rotation sensor 24. Then, the electronic control unit 50 calculates an electric frequency FA (Hz) by adding a previously obtained slip frequency S (Hz) to the calculated electric frequency fr (Hz).

The electronic control unit 50 activates the second inverter 34 so that an AC current of the current I (A) is supplied to the stator coil of the induction MG 14 at the electric frequency FA (Hz) and generates a torque and a drive force corresponding to a traveling condition. When the torque command Tr is Tr1 as shown in FIG. 2, the slip frequency S is S1 from the optimum efficiency line E shown in FIG. 2 and the current is a current I2 of the characteristic curve which is a broken line "b". As a result, the electronic control unit 50 calculates an electric frequency FA (Hz) by adding the slip frequency S1 (Hz) to the electric frequency fr (Hz) of the rotor and activates an inverter 40 so that an AC current of the current I2 (A) is supplied to the stator coil of the induction MG 14 at the electric frequency FA (Hz).

The electronic control unit 50 may calculate a torque command Tr for the synchronous MG 12 and the induction MG 14 based on the traveling data of the electrically-driven vehicle 10 and obtain a waveform and a voltage of a three-phase AC power supplied to the stator coils of the synchronous MG 12 and the induction MG 14 from the control map based on the calculated torque command Tr. The electronic control unit 50 activates the first inverter 32, the second inverter 34 and the boost converter 36 to generate a torque and a drive force corresponding to a traveling condition by supplying the three-phase AC power with the above-mentioned waveform and voltage to the synchronous MG 12 and the induction MG 14.

In this case, the electronic control unit 50 can calculate a request torque which should be output to the axles 21, 23 based on the accelerator position AP or the vehicle velocity and the accelerator position AP. In this case, the electronic control unit 50 obtains the request torque for the synchronous MG12 and the induction MG 14 so that a requested power corresponding to the request torque is output to the respective axles 21, 23 to control driving of the synchronous MG 12 and the induction MG 14 in correspondence to the request torque. A ratio for distributing the request torque to the respective axles 21, 23 is predetermined by the traveling condition or an operation of a switch (not shown).

Next, an operation of the electrically-driven vehicle 10 will be described. The electrically-driven vehicle 10 has the synchronous MG 12 which is connected to the battery 11 in common with the induction MG 14. In this case, a torque ripple is generated due to a rotation of the rotor of the synchronous MG 12 and consequently, a current ripple which is a current fluctuation is generated in the battery current IB. Although the capacitors 37, 38 are connected between the battery 11 and the synchronous MG 12, a current ripple which cannot be absorbed by the capacitors 37, 38 is generated in the battery current IB. The frequency of the current ripple is determined by the electric frequency of an AC current supplied to the synchronous MG 12 and the number of poles of the rotor and stator so that the frequency becomes of integer times the electric frequency of the AC current supplied to the synchronous MG 12. For example, if the electric frequency of the AC current supplied to the synchronous MG 12 is FA1, the frequency of electric N-order component of the current ripple generated in the synchronous MG 12 is N×FA1. Here, the frequency of the electric 6th-order component where N=6 is 6×FA1.

It is known that the amplitude of the electric 6th-order component in the electric ripple of the battery current IB is maximized when the synchronous MG 12 is rotated because the first inverter 32 having the three phases is connected to the synchronous MG 12. Even when the rotation of the synchronous MG 12 is stopped, if the first inverter 32 is switched, a current ripple is generated in the battery current IB based on a carrier frequency to be used for the switching control.

Then, the electronic control unit 50 changes the slip frequency command S* of AC power supplied to the induction MG 14. Consequently, the slip frequency command S* of the induction MG 14 is changed so that a frequency (6×FA2) which is six times larger than the electric frequency FA2 of the AC current supplied to the induction MG 14 coincides with a predetermined frequency fa of a frequency of the components of which amplitude is the largest among the frequency components of the electric ripple. As described later, this can accelerate a temperature rise of the battery 11 by increasing the fluctuation of the battery current IB while keeping the output torque constant.

More specifically, the electronic control unit 50 executes the battery temperature rise control program 56 having the IB fluctuation increase program 58 as shown in FIG. 1. The battery temperature rise control program 56 specifies a processing of steps S10 to S12 and S14 to S20 described below and the IB fluctuation increase program 58 specifies a processing of steps S14 to S18. Consequently, the electronic control unit 50, when a predetermined condition including an ON operation of a starter switch (not shown) or an ignition switch (not shown) of the electrically-driven vehicle 10 is established, starts monitoring of the battery temperature TB detected by the battery temperature sensor 11b. Hereinafter, "step S" is described merely as "S".

In S11, the electronic control unit 50 determines whether the temperature of the battery 11 is low or the battery temperature TB is less than a predetermined temperature TA (° C.) set in advance. If it is less than the predetermined temperature TA (° C.), the battery temperature rise control is started in S12. On the other hand, if the battery temperature TB is the predetermined temperature TA (° C.) or more in S11, the electronic control unit 50 determines that the temperature rise of the battery 11 is unnecessary and then executes the regular control of S13.

If the battery temperature rise control is started in S12, the electronic control unit 50 changes the slip frequency command S* of the induction MG 14 based on the predetermined frequency of the current ripple of the battery current IB such that the amplitude of the current ripple increases.

More specifically, in S14, the battery current IB is detected by the battery current sensor 11a so as to analyze the fluctuation frequency of the battery current IB. In this case, respective fluctuation frequencies f1, f2, fa, f3, f4 and a distribution of the amplitude WB (A) at its fluctuation frequencies f1, f2, fa, f3, f4 (Hz) are obtained as shown in FIG. 4(f). The frequency analysis may be performed by, for example, a general method including the FFT. Then, in S15 of FIG. 3, the electronic control unit 50 identifies a component of the predetermined frequency in which the amplitude WB is the maximum in the respective fluctuation frequencies f1, f2, fa, f3, f4, and determines the slip frequency command S* of the induction MG 14 in S16.

For example, in the case of FIG. 4(f), the predetermined frequency at the maximum amplitude is fa (Hz) and the amplitude is less than a first threshold B1 set in advance. In S17 of FIG. 3, the electronic control unit 50 changes the slip frequency command S* of the induction MG 14 based on the predetermined frequency fa of the battery current ripple. Hereinafter, the component in the predetermined frequency of the battery current ripple may be described as "maximum amplitude component".

In the induction MG 14, a torque ripple is generated due to a rotation of the rotor thereof similar to the synchronous MG 12 and consequently, a current ripple is generated. The frequency of the current ripple is determined by the electric frequency of an AC current supplied to the induction MG 14 as well as the number of poles of the rotor and stator so that the frequency is of integer times the electric frequency of the AC current supplied to the induction MG 14. Here, it is known that the frequency of the electric $6^{th}$-order component has maximum amplitude. In this case, if the electric frequency of the AC current supplied to the induction MG 14 is FA2, the frequency of the electric 6th-order component of the current ripple generated in the induction MG 14 is 6×FA2.

Figure 4:
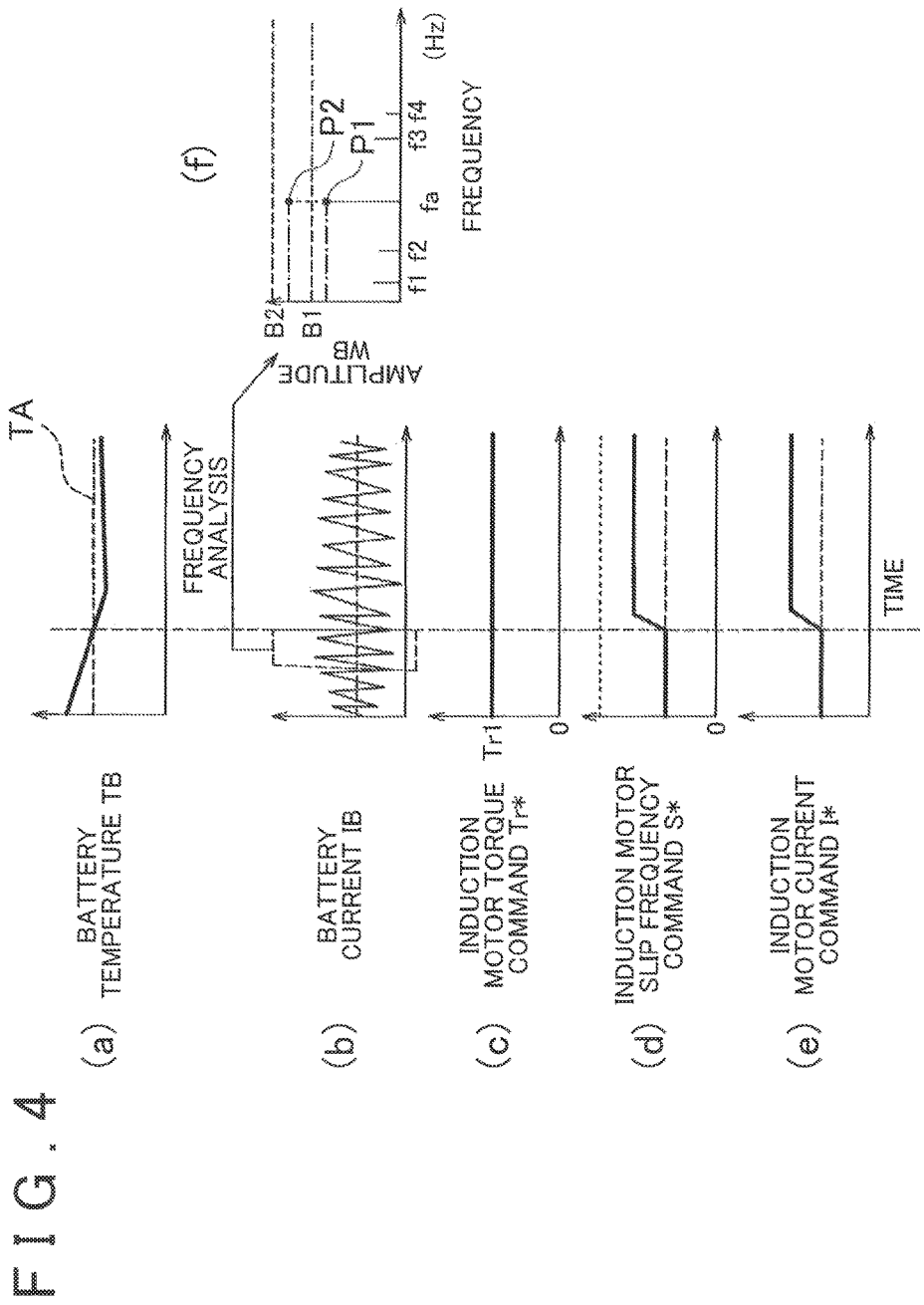
FIG. 4 is a diagram showing changes with time lapse of a battery temperature TB, a battery current IB, an induction motor torque command Tr*, a slip frequency command S*, and an induction motor current command I*, and a frequency analysis of the battery current IB of the electrically-driven vehicle according to the embodiment of the present invention when the battery temperature rise control shown in FIG. 3 is executed.

If, as shown in FIG. 4 (f), the frequency of a component having the maximum amplitude that is less than the first threshold B1 is fa, by adjusting the frequency of the 6th-order component of the current ripple of the induction MG 14, to be 6×FA2=fa, the frequency (6×FA2) of the current ripple having the maximum amplitude generated in the induction MG 14 can be made to agree with the frequency fa having the maximum amplitude of the battery current ripple. A difference between the rotational speed (electric frequency) fr of the rotor of the induction MG 14 and the electric frequency FA2 of the AC power supplied to the stator of the induction MG 14 is the slip frequency S, hence $$S=FA2-fr \quad (1).$$

Thus, by substituting FA2=fa/6 into the expression (1), it becomes that $$S=fa/6-fr \quad (2).$$

Thus, if the electric frequency of the rotor of the induction MG 14 detected by the second rotation sensor 24 is fr, the slip frequency command S* of the AC power supplied to the stator of the induction MG 14 is changed like the slip frequency S calculated according to the above-described equation (2).

Figure 5:
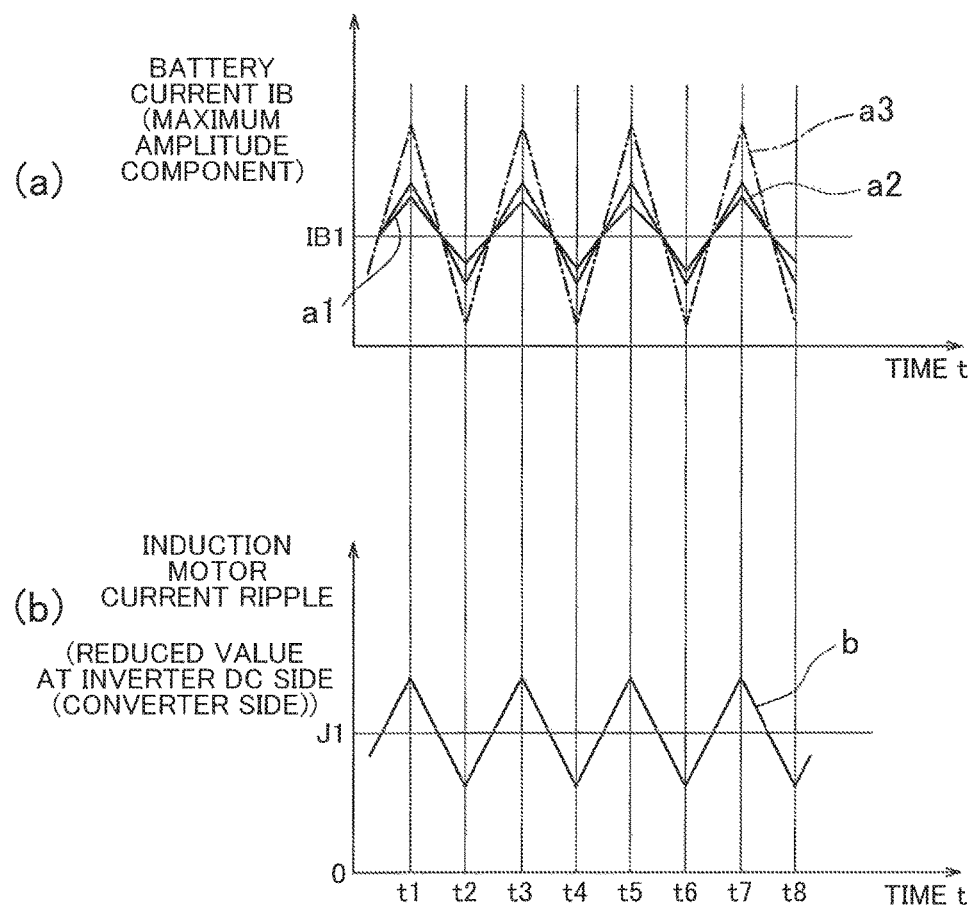
FIG. 5 is a diagram showing changes with time lapse of the battery current IB and converted values on the DC side (converter side) of an inverter of current ripple of the induction motor.

FIG. 5(a) shows changes with time lapse of the component having a maximum amplitude of the current ripple of the battery current IB. FIG. 5(b) shows changes with time lapse of the current ripple of the 6th-order component of the induction MG 14. When the slip frequency S is changed as described above, a frequency fa or a period of the maximum amplitude component of the battery current IB shown by a line "a1" in FIG. 5(a) coincides with a frequency (6×FA2) or a period of the 6th-order component of the current ripple generated in the induction MG 14 shown by a line "b" in FIG. 5(b).

When the slip frequency command S* is changed, the current command is selected to keep the output torque of the induction MG 14 constant so that no vehicle vibration occurs to the electrically-driven vehicle 10. For example, if the torque command is Tr1 on the optimum efficiency line E of the characteristic curve shown in FIG. 2, when the slip frequency command S* is changed from S1 to S2, the current command is selected to be changed from I2 to I3 so that the torque command is kept constant.

Figure 3:
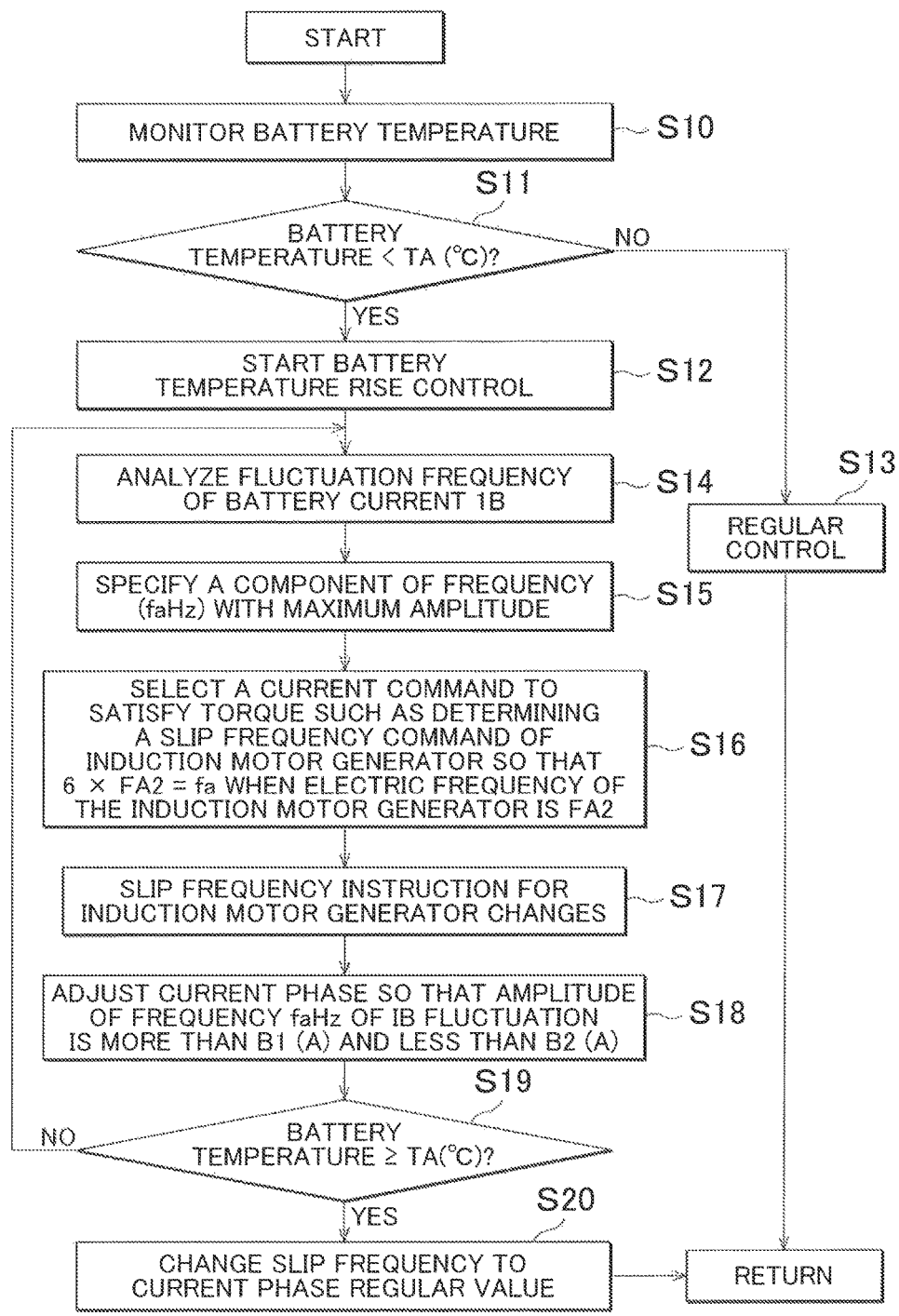
FIG. 3 is a flow chart for explaining a battery temperature rise control method for the electrically-driven vehicle according to the embodiment of the present invention.

Next, in S18 of FIG. 3, the electronic control unit 50 adjusts the phase of the AC current supplied to the stator of the induction MG 14. In this case, the electronic control unit 50 adjusts the current phase such that the amplitude WB at a frequency of the maximum amplitude of the battery current ripple is more than the first threshold B1 and less than the second threshold B2, which is a predetermined range set in advance. For example, as shown in FIG. 5(a) and FIG. 5(b), the phase of the AC power supplied to the stator is changed so that a peak of the maximum amplitude component at time t1 and a peak of the current ripple generated in the induction MG 14 coincide with each other. When the peak of the maximum amplitude component and the peak of the current ripple generated in the induction MG 14 coincide with each other, an electric oscillation having the same phase as a oscillation of the maximum amplitude component is generated by a oscillation of the current ripple generated in the induction MG 14 as indicated by the line "a2" in FIG. 5(a). Due to such a current oscillation of the same phase, the amplitude of the battery current fluctuation increases as indicated with a dashed line "a3" in FIG. 5(a).

The electronic control unit 50 detects a battery current fluctuation as a current feedback and analyzes the frequency. Then, the electronic control unit 50 obtains the maximum amplitude component again and determines whether the amplitude WB at the frequency having the maximum amplitude is within the predetermined range from more than B1 and less than B2 as shown in FIG. 4(f). If the amplitude at the frequency having the maximum amplitude is within the predetermined range, the electronic control unit 50 determines that the current phase has been adjusted appropriately and proceeds to S19. The second threshold B2 is an upper limit value which is set in advance to prevent a trouble in any part.

If the amplitude WB of the maximum amplitude component is less than B1, the phase of the AC current is changed to decrease the difference in phase because the difference in phase between the peak of the maximum amplitude component and the peak of the current ripple generated in the induction MG 14 is too large. On the other hand, when the amplitude of the maximum amplitude component exceeds B2, the difference in phase between the peak of the maximum amplitude component and the peak of the current ripple generated in the induction MG 14 is zero or too small. Thus, the phase of the AC current is changed to increase the difference in phase. In this case, by monitoring the phases of the synchronous MG 12 and the induction MG 14 when the synchronous MG 12 is rotated, a relationship between an amount of a shift in phase of the induction MG 14 with respect to the phase of the synchronous MG 12 and an amount of fluctuation of the amplitude WB of the maximum amplitude component can be identified. Thus, the phase deviation may be appropriately adjusted using this relationship.

In S19 of FIG. 3, whether the battery temperature TB is a predetermined temperature TA or more is determined. If the battery temperature TB is less than the predetermined temperature TA, the processing is returned to S14. If the battery temperature TB is the predetermined temperature TA or more, the processing proceeds to S20. If the battery temperature TB is below the predetermined temperature TA in S19, the processing is returned to S14 and the processing from S14 to S18 is repeated. In S20, the electronic control unit 50 determines that the temperature rise to the temperature more than the predetermined temperature TA of the battery 11 has been finished and changes the slip frequency command S* and the current phase to regular values for the regular control. Then, the electronic control unit 50 returns to S10. In this case, the electronic control unit 50 may proceed to the regular control of S13 without returning to S10.

In the synchronous MG 12, the rotational speed (electric frequency) of the AC power supplied to the stator coil is synchronous with the rotational speed (electric frequency) of the rotor. As a result, the torque fluctuation is generated at a frequency of integer times the frequency of the AC power supplied to the stator coil depending on the number of poles of the rotor and the stator. The oscillation of the battery current IB is often induced by a fluctuation of the reverse voltage due to this torque fluctuation. Thus, in S18 of FIG. 3, the phase of the AC current supplied to the induction MG 14 may be changed with respect to a phase of an AC current supplied to the synchronous MG 12. For example, by changing the phase to a direction of the same phase or to the direction of a reverse phase, the phase of the AC current supplied to the induction MG 14 may be adjusted so that the amplitude WB of the maximum amplitude component is within the predetermined range.

According to the above-described configuration of the electrically-driven vehicle, the fluctuation of the current IB can be increased while the output torque is kept constant when the temperature of the battery 11 is low, and thus the temperature rise of the battery 11 can be accelerated. Further, it is not necessary to provide any temperature rising apparatus such as a battery heater to increase the temperature of the battery 11. Thus cost reduction is achieved. Further, because the low temperature time of the battery 11 can be reduced, even if the charge and discharge power is limited at low temperatures of the battery 11, operability and fuel consumption can be improved by relaxing the limit on the charge and discharge power.

Next, another first example of the embodiments of the present invention will be described with reference to FIG. 6 and FIG. 7. Description of the same parts as those explained with reference to FIG. 1 to FIG. 5 is omitted or simplified. According to the present embodiment, the electronic control unit 50 changes the slip frequency command of the induction MG 14 so as to oscillate the slip frequency command of the induction MG 14 with the predetermined frequency. The "predetermined frequency" refers to a frequency of which amplitude is the maximum in frequency components in the battery current ripple.

More specifically, by referring to FIG. 1, the battery temperature rise control program 56 specifies a processing of steps S30 to S32 and S34 to S40 described later and the IB fluctuation increase program 58 specifies a processing of steps S34 to S38. The processing of S30 to S35 in FIG. 6 is the same as the processing of S10 to S15 in FIG. 5.

In S36, S37, the electronic control unit 50 determines a oscillation amplitude of the slip frequency of the induction MG 14 and selects a current command so that the output torque of the induction MG 14 is kept constant.

Here, the oscillation of the slip frequency S of the induction MG 14 is performed by periodically bringing the operating point of the induction MG 14 near to or away from the optimum efficiency line E shown in FIG. 2 while keeping the output torque of the induction MG 14 constant. For example, the oscillation is performed by reciprocating the operating point horizontally between a point P1 and a point P4 on FIG. 2.

For example, as shown in FIG. 2, the induction MG 14 is operated at a point P1 on the optimum efficiency line E which is determined by the output torque Tr1, the slip frequency S1 and the current I2. From a result of the frequency analysis, it is found that the predetermined frequency having the maximum amplitude of the battery current ripple is the frequency fa (Hz) similar to the case of FIG. 4(f). Thus, the electronic control unit 50 increases or decreases the slip frequency command S* at the frequency fa (Hz) or between S1 and S4 (between the point P1 and the point P4) in the period 1/fa [sec] so that the torque command Tr* of the induction MG 14 is constant. Here, the reason for keeping the output torque of the induction MG 14 constant is to restrict generation of vehicle vibration of the electrically-driven vehicle 10. In the meantime, because the induction MG 14 is operated at the point P1 on the optimum efficiency line E, it can increase power consumption of the induction MG 14 by changing the slip frequency command S* while keeping the torque command Tr* constant. However, it is difficult to decrease the power consumption of the induction MG 14 to be smaller than that at the point P1.

FIG. 7(a) shows changes with time lapse of the maximum amplitude component of the current ripple of the battery current IB. The maximum amplitude component of the current ripple of the battery current IB is oscillated at the frequency fa (Hz) as shown by the line "a" in FIG. 7(a). Thus, the interval from the time t1 to the time t5 in FIG. 7 is the period 1/fa [sec]. Consequently, when the slip frequency command S* is oscillated so that the operating point of the induction MG14 is reciprocated between the point P1 and the point P4 in the period between the time t1 and the time t5 in FIG. 7 so as to oscillate the power consumption of the induction MG 14, the lower peak of the battery current can be changed largely to the negative side. As a result, the amplitude of the fluctuation can be increased. On the other hand, in a time period in which the battery current is higher than a predetermined current Ic like in a period between a time t2 and a time t4 in FIG. 7(a), even if the operating point of the induction MG 14 is moved to the point other than the point P1, it cannot be moved in a direction of decreasing power consumption of the induction MG 14. Thus, in this period, the slip frequency command S* needs to be kept constant at the original S1 so that the induction MG 14 is operated at the point P1 shown in FIG. 2.

Thus, the slip frequency command S* must be in such a waveform that it is reciprocated between S1 and S4 in a time that is ½ of the period 1/fa [sec] while it is kept constant at S1 in a time that is ½ of the remaining period 1/fa [sec] so that the period of S4 at the peak is 1/fa [sec]. For example, as shown by a line "c" in FIG. 7(c), the slip frequency command S* is in such a waveform that the slip frequency command S* is reciprocated between S1 and S4 in periods between the time t0 and t2, between a time t4 and t6 and between a time t8 and t10 while the slip frequency command S* is kept constant at S1 in periods between the time t2 and the time t4, between the time t6 and t8. This waveform is such a waveform (a waveform indicated with a line "c" in FIG. 7(c)) that a time interval in which the slip frequency command S* proceeds from S4 at a peak to S4 at a next peak is equal to time intervals from the time t1 to the time t5 and from the time t5 to the time t9, when the battery current fluctuation proceeds from a peak to another peak on the lower side.

When the slip frequency command S* is increased from S1 to S4 like in the time interval between the t0 and t2 while the torque command Tr* of the induction MG 14 is kept constant, the electronic control unit 50 moves the operating point of the induction MG 14 from P1 to P2 as shown in FIG. 2. At this time, the current must be reduced from I2 at the point P1 to I3 at the point P2. Next, when the operating point of the induction MG 14 is moved from P2 to P3 as shown in FIG. 2, the current must be increased from I3 at the point P2 to I2 at the point P3. Then, when the operating point of the induction MG 14 is moved from P3 to P4 as shown in FIG. 2, the current must be increased from I2 at the point P3 to a maximum current of I1 at the point P1. Thus, when the slip frequency command S* is increased from S1 to S4 like in a time interval between time t0 and t2 as shown by a line "c" in FIG. 7(c), the current command I* of the induction MG 14 is in such an command waveform that the current command I* is once decreased from I2 to I3 in a time interval from time t0 to time t2 and then is increased to I1 at an upper peak. When the slip frequency command S* is decreased from S4 to S1, a reverse process is taken such that the current command I* is once decreased from I1 at the peak down to I3 and then is returned to the original I2.

When the slip frequency command S* and the current command I* of the induction MG 14 are fluctuated with the above-described waveform, the output torque of the induction MG 14 is kept constant at Tr1 as shown by a line "b" in FIG. 7(b). Then, as shown by a line "e" in FIG. 7(e), the power consumption Pw of the induction MG 14 is increased from the original P1 in the time period between time t0 and t2, so that the battery current fluctuation is changed largely to the negative side. Further, the original P1 is held in the time interval from time t2 to t4. The time interval of the lower peaks of the battery current fluctuation which is a peak interval of power consumption is a period 1/fa (sec) between time t1 and t5.

Figure 6:
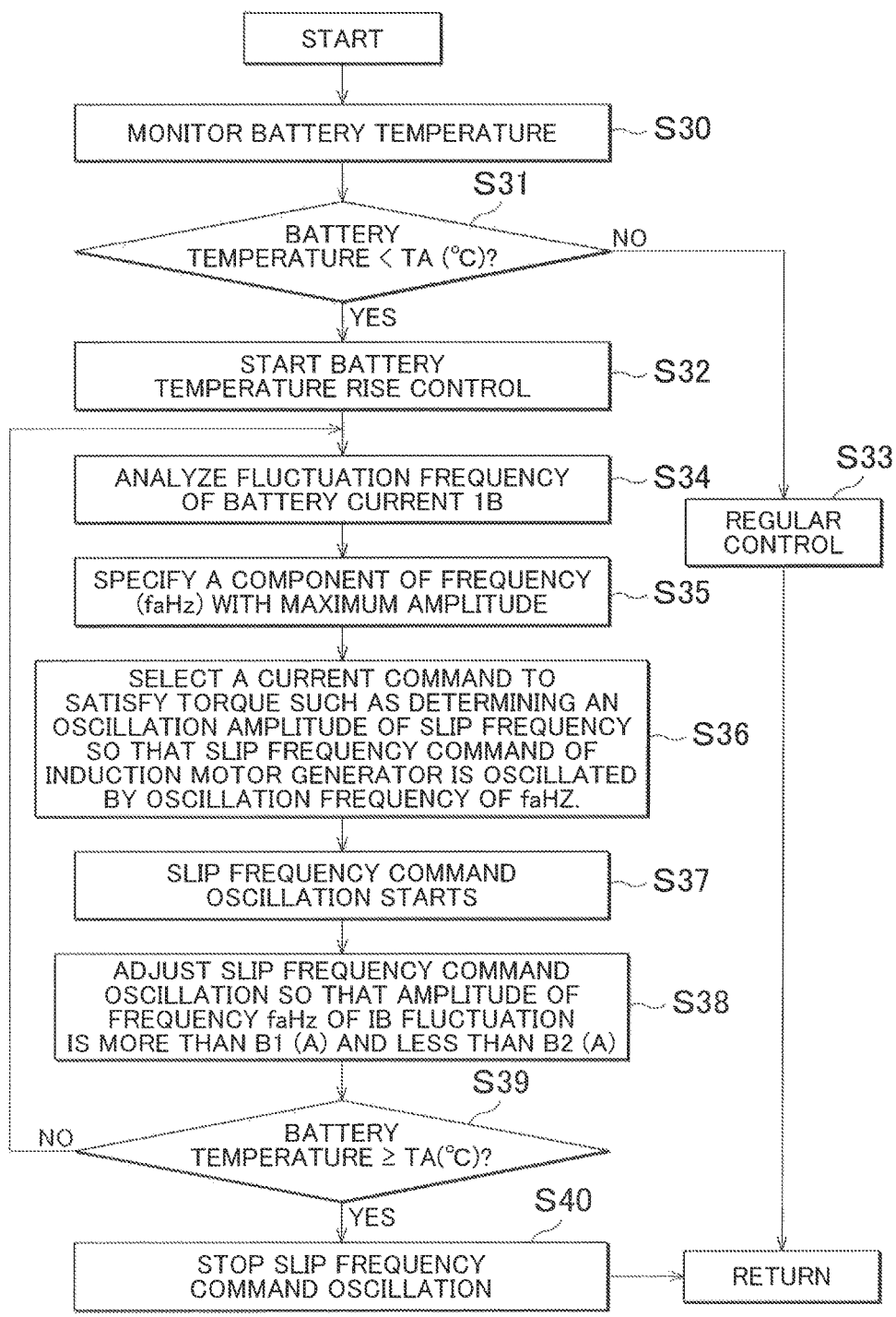
FIG. 6 is a flow chart for explaining another first example of the battery temperature rise control method for the electrically-driven vehicle according to the embodiment of the present invention.

Then, in S36 of FIG. 6, the electronic control unit 50 keeps the output torque of the induction MG 14 in S36 of FIG. 6 constant and determines a oscillation amplitude (e.g., a difference between S1 and S4) of the slip frequency command S* such that the slip frequency command S* is oscillated by the frequency fa (Hz) (period of 1/fa (sec)) while keeping the output torque of the induction MG 14 constant. Then, the electronic control unit 50 selects the current command I* of the induction MG 14 as described above. Then, the electronic control unit 50 starts oscillation of the slip frequency command S* of the induction MG 14 in S37 of FIG. 6.

Next, in S38 of FIG. 6, the electronic control unit 50 adjusts the phase of the oscillation of the slip frequency command S*. In this case, the electronic control unit 50 adjusts the oscillation phase so that the amplitude WB at a frequency in which the maximum amplitude of the battery current ripple is kept at more than the first threshold B1 and less than the second threshold B2, which is a predetermined range set in advance. The reason for adjusting the amplitude WB to the second threshold B2 or less is the same as the case of adjusting the current phase in S18 of FIG. 3.

Because the fluctuation of the battery current is increased by starting the oscillation of the slip frequency command S*, temperature rise of the battery 11 is accelerated. Then, in S39, whether the battery temperature is increased to the predetermined temperature TA or more is determined. If it is the predetermined temperature or more, the oscillation of the slip frequency command S* of the induction MG 14 is stopped in S40 and the processing is returned to S30. If the battery temperature is the predetermined temperature TA or more in S31, the processing is moved to the regular control in S33. On the other hand, if the battery temperature in S39 is below the predetermined temperature TA, the processing is returned to S34 in which the processing from S34 to S38 is repeated. The configuration of the present example can also accelerate the temperature rise of the battery 11 when the temperature of the battery 11 is low.

Next, another second example of the embodiments of the present invention will be described with reference to FIG. 8A and FIG. 8B. In the method described with reference to FIG. 6 and FIG. 7 of increasing the fluctuation of the battery current by oscillating the slip frequency command S* of the induction MG 14, the output torque is kept constant by oscillating the slip frequency command S* so as to suppress generation of vibration in the electrically-driven vehicle 10. However, the control method of FIG. 6 and FIG. 7 sometimes fails to keep the output torque constant during a transition. Particularly, when the slip frequency command S* is oscillated at a low frequency, the fluctuation of the output torque at the time of a transition may sometimes lead to a vehicle vibration of the electrically-driven vehicle 10. On the other hand, when the slip frequency command S* is oscillated at a high frequency, a moment of inertia or the like of a rotary driving portion inhibits a fluctuation of an actual torque which generates the vehicle vibration even when the output torque is not kept constant. As a result, the control method of FIG. 6 and FIG. 7 can increase the fluctuation of the battery current while suppressing the vehicle vibration more effectively when the predetermined frequency fa of the maximum amplitude component of the battery current is generated in a high frequency region.

On the other hand, according to the method of changing the slip frequency command so that a frequency which is six times larger than the electric frequency FA of the AC current supplied to the induction MG 14 coincides with the predetermined frequency fa, which has been described with reference to FIG. 1 to FIG. 5, the slip frequency command S* must be set to a slip frequency S according to the equation (2) already described above (which will be explained again later).

$$S=fa/6-fr \qquad (2)$$

In the induction MG 14, as shown in FIG. 2, when the slip frequency S is increased from S1 to S4 so as to move the operating point of the induction MG 14 from the original point P1 to the point P4, the operating point is moved so that the output torque is kept constant by changing the current. In this case, the operating point can be moved horizontally in FIG. 2. However, if the frequency fa of the maximum amplitude component is increased, the slip frequency S calculated according to the above equation (2) must be adjusted to S4 or higher in some cases. If the slip frequency S is increased to S4 or higher, the output torque of the induction MG 14 drops along the line a indicating "a" characteristic in which the maximum current I1 is selected, and if the slip frequency S is S5, the output torque drops from Tr1 to Tr4. Thus, a drive force necessary for travelling of the electrically-driven vehicle 10 may become insufficient in some cases. As a result, the control method of FIG. 1 and FIG. 5 can increase the fluctuation of the battery current while suppressing the vehicle vibration more effectively when the predetermined frequency fa of the maximum amplitude component of the battery current is generated in a low frequency region.

Thus, according to the control method of the present example, the first processing which is the control described in FIG. 1 to FIG. 5 is executed if the frequency fa of the maximum amplitude component of the battery current is less than a predetermined value D set in advance. If the frequency fa is the predetermined value D or more, the second processing which is the control described in FIG. 6 and FIG. 7 is executed.

More specifically, by referring to FIG. 1, the battery temperature rise control program 56 included in the electronic control unit 50 specifies a processing of steps S50 to S52 and S54 to S60 described later and the IB fluctuation increase program 58 specifies a processing of steps S54 to S59 and S61 to S63. The processing of S50 to S55 in FIG. 8A is the same as the processing of S10 to S15 in FIG. 3.

Figure 8A:
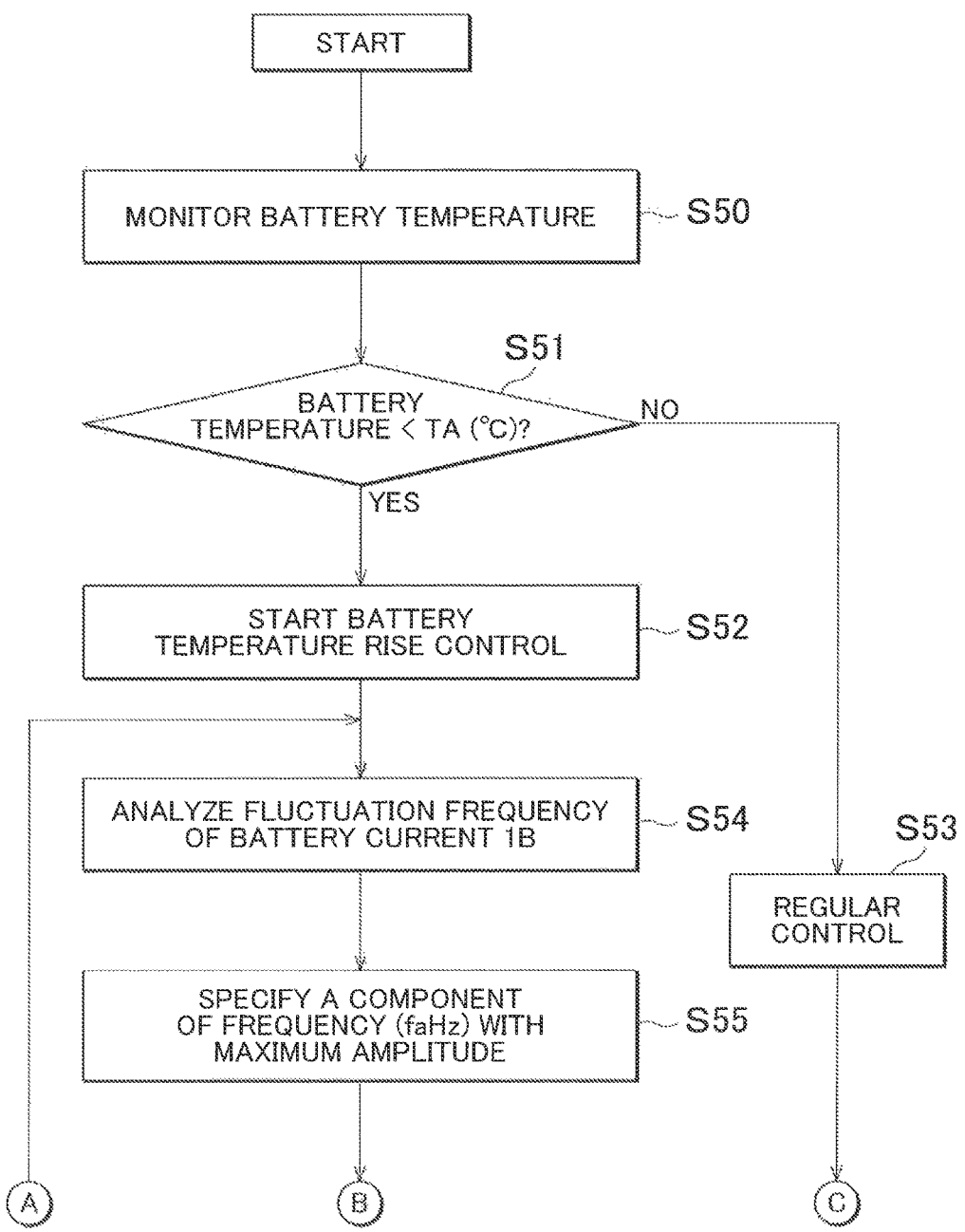
FIG. 8B is a flow chart for explaining another second example of the battery temperature rise control method for the electrically-driven vehicle according to the embodiment of the present invention.

In S54, S55 of FIG. 8A, after analyzing the fluctuation frequency of the battery current, the electronic control unit 50 identifies the maximum amplitude component and in S56, determines whether the predetermined frequency fa of the maximum amplitude component is the predetermined value D or more. Here, the predetermined value D may be a value determined by the rotation electric frequency fr of a rotor of the induction MG 14 and an integer N determined by a pole number thereof when the slip frequency is set to the maximum slip frequency in which the output torque of S=S4 is kept constant. In this case, an equation (3) is established.

$$D=N \times (fr+S4) \qquad (3)$$

Here, N is a multiple of the frequency of the current ripple generated in the induction MG 14 with respect to the rotation electric frequency fr of the rotor of the induction MG 14 or a degree of the electric frequency. For example, N=6.

Then, if the predetermined frequency fa is the predetermined value D or more, the electronic control unit 50 executes the second processing as shown in S57 to S59 in FIG. 8B. The "second processing" is the same processing as for the battery temperature rise control described in FIG. 6 and FIG. 7. The electronic control unit 50 changes and oscillates the slip frequency command S* of the induction MG14 with the predetermined frequency fa. The processing of S57 to S59 is the same as the processing of S36 to S38 in FIG. 6.

On the other hand, if the predetermined frequency fa is below the predetermined value D, the electronic control unit 50 executes the first processing as shown in S61 to S63 of FIG. 8B. The "first processing" is the same processing as for the battery temperature rise control described in FIG. 1 to FIG. 5. The electronic control unit 50 changes the slip frequency command S* of the induction MG so that a frequency which is six times the electric frequency FA of the AC current supplied to the induction MG 14 coincides with the predetermined frequency fa. The processing of S61 to S63 is the same as the processing of S16 to S18 in FIG. 3.

As described above, according to the control of the present example, in addition to the effects of each example of the two embodiments described with reference to FIG. 1 to FIG. 7, a more effective control is executed corresponding to a magnitude of the frequency fa having a maximum amplitude in the battery current fluctuation. As a result, the present control can corresponds to a wider range of the frequency fa.

A configuration of each example of the embodiments described above intends to increase the battery current fluctuation by the battery temperature rise control using the battery current IB detected by the battery current sensor 11a. However, the slip frequency command of the induction MG may be changed using the detection value of the reactor current sensor described above, so as to increase the fluctuation of the reactor current which is a battery current that relates to the battery current when the temperature of the battery 11 is low. This allows the battery current fluctuation to increase indirectly, so that the temperature rise of the battery 11 can be accelerated. When the slip frequency command of the induction MG is changed to increase the reactor current fluctuation, in each example described above, the reactor current is used instead of the battery current for the controls in FIG. 3, FIG. 6, FIG. 8A and FIG. 8B. For instance, the frequency analysis of the fluctuation of the reactor current is performed instead of the battery current IB. The battery-related current is not limited to the reactor current but may be a current having a specific relationship with the battery current.

A case where the induction MG 14 is connected to the battery 11 via the boost converter 36 has been described above. However, the induction MG 14 may be connected to the battery 11 without the boost converter 36. Further, the battery 11 may be connected to the synchronous MG 12 and the induction MG 14 without the boost converter.

In the above-described embodiments, the electrically-driven vehicle 10, in which the front wheels 16 are driven with the synchronous MG 12 and the rear wheels 18 are driven with the induction MG 14, has been described. However, the present invention may be applied to an electrically-driven vehicle in which the rear wheels are driven with the synchronous MG 12 and the front wheels 16 are driven with the induction MG 14.

In the above-described embodiments, a case where the electrically-driven vehicle 10 is equipped with a single synchronous MG 12 and a single induction MG 14 has been described. However, it may be equipped with a plurality of the synchronous MG 12 and a plurality of the induction MG 14. For example, the present invention may be applied to the electrically-driven vehicle in which the front wheels 16 are driven with the first synchronous MG and the first induction MG and the rear wheels are driven with the second synchronous MG and the second induction MG. In this way, the electrically-driven vehicle 10 with the plurality of the induction MG may be configured in a manner that the slip frequency command S* of one or the plurality of the induction MGs is changed when the battery temperature is low. The present invention may be carried out by using two or more electronic control units.

The present invention is not restricted to the above-described embodiments, but includes all modifications and alterations which do not depart from the technical scope and spirit of the present invention specified by claims.

What is claimed is:

1. An electrically-driven vehicle comprising:
   a battery;
   an induction motor connected to the battery;
   a synchronous motor connected to the battery that is connected to the induction motor; and
   at least one electronic control unit configured to:
   change a slip frequency command of the induction motor based on a predetermined frequency of a current fluctuation when a temperature of the battery is low such that an amplitude of the current fluctuation increases, the current fluctuation being any one of current fluctuation of a battery current or current fluctuation of a battery-related current that relates to the battery current,
   wherein the predetermined frequency is a frequency of which an amplitude is a maximum in frequency components of the current fluctuation;
   select a current command to satisfy torque such as determining a slip frequency command of induction motor generator such that 6 ×FA2=fa when electric frequency of the induction motor generator is FA2, wherein FA2 is the electric frequency and fa is the predetermined frequency; and
   adjust current phase such that amplitude for frequency faHz of battery current fluctuation is more than B1 (A) and less than B2 (A), wherein B1 (A) is a first threshold and B2 (A) is a second threshold.

2. The electrically-driven vehicle according to claim 1, wherein the electronic control unit is configured to change the slip frequency command of the induction motor such that a frequency which is six times larger than electric frequency of an alternating current supplied to the induction motor coincides with the predetermined frequency.

3. The electrically-driven vehicle according to claim 1, wherein the electronic control unit is configured to change the slip frequency command of the induction motor such that the slip frequency command of the induction motor oscillates at the predetermined frequency.

4. The electrically-driven vehicle according to claim 1, wherein the electronic control unit is configured to:
   i) select one of a first processing or a second processing to be executed based on a magnitude of the predetermined frequency,
   the first processing being a processing of changing the slip frequency command of the induction motor such that the frequency which is six times larger than electric frequency of an alternating current supplied to the induction motor coincides with the predetermined frequency,
   the second processing being a processing of changing the slip frequency command of the induction motor such that the slip frequency command of the induction motor oscillates at the predetermined frequency; and
   ii) execute the first processing when the predetermined frequency is less than a predetermined value and execute the second processing when the predetermined frequency is equal to or larger than the predetermined value.

5. The electrically-driven vehicle according to claim 1, wherein the electronic control unit is configured to keep an output torque of the induction motor constant when the slip frequency command of the induction motor is changed.

6. The electrically-driven vehicle according to claim 1, wherein the electronic control unit is configured to adjust a current phase such that when the slip frequency command of the induction motor is changed, an amplitude of a frequency when the amplitude of the current fluctuation of the battery current is a maximum is maintained in a predetermined range set in advance.

* * * * *